No. 821,475. PATENTED MAY 22, 1906.
W. DWORZYNSKI.
AUTOMATIC ELECTRICAL BALANCE.
APPLICATION FILED JULY 11, 1904.

3 SHEETS—SHEET 1.

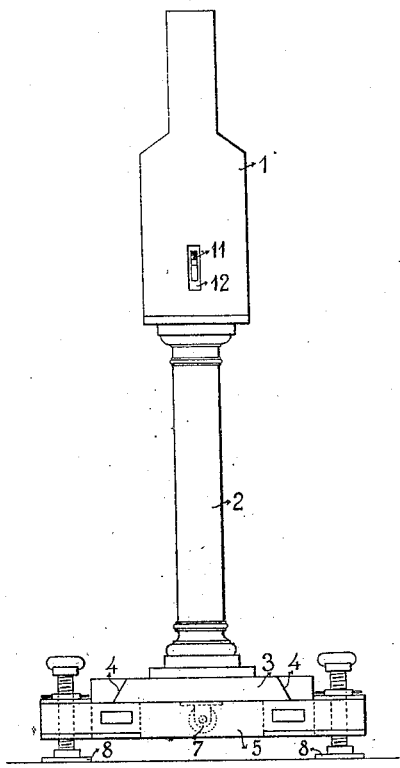
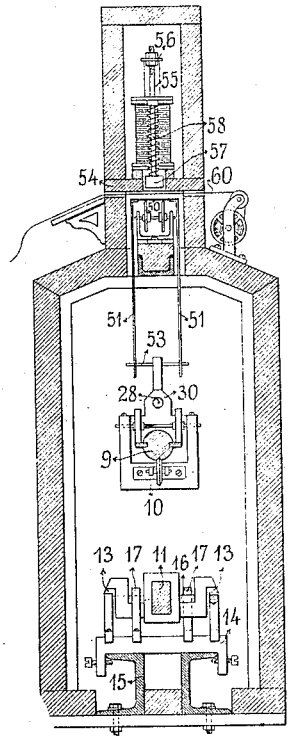
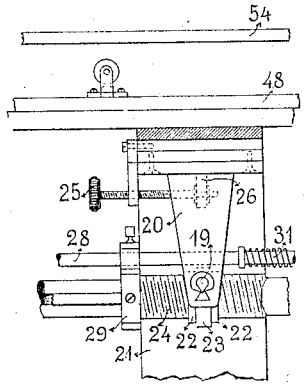
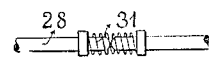
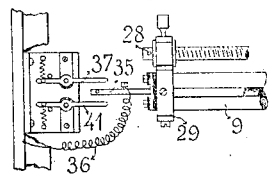
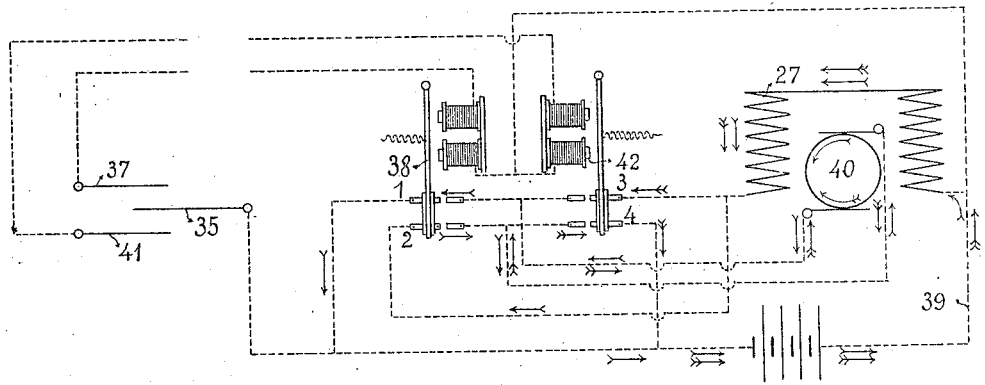

No. 821,475. PATENTED MAY 22, 1906.
W. DWORZYNSKI.
AUTOMATIC ELECTRICAL BALANCE.
APPLICATION FILED JULY 11, 1904.

3 SHEETS—SHEET 3.

UNITED STATES PATENT OFFICE.

WINCENTY DWORZYNSKI, OF WARSAW, RUSSIA.

AUTOMATIC ELECTRICAL BALANCE.

No. 821,475.　　　　　　Specification of Letters Patent.　　　　　Patented May 22, 1906.

Application filed July 11, 1904. Serial No. 216,063.

*To all whom it may concern:*

Be it known that I, WINCENTY DWORZYNSKI, engineer, a subject of the Emperor of Russia, residing at 43 Krucza street, Warsaw, in Russia, have invented certain new and useful Improvements in new or Improved Automatic Electrical Balances; and I do hereby declare the following to be a full, clear, and exact description of the invention, such as will enable others skilled in the art to which it appertains to make and use the same.

This invention relates to automatic electrical balances in which the sliding weight is so balanced by an electromotor that the beam plays between two stops which cause circuits to be closed when the beam comes in contact therewith and revolution of the electromotor in one or other direction to take place. In distinction from the balances of this kind hitherto known in which two contacts with several corresponding wires leading to the motor are arranged on the beam itself according to the present invention the beam is provided with only one contact and one wire, said contact oscillating between two fixed contacts and when in contact with one or the other closing the circuit of two different relays, which put the motor in circuit and cause it to revolve in one or other direction.

One of the large number of forms of construction of the automatic balances constructed according to said principle is shown in the annexed drawings as an example.

Figure 1:
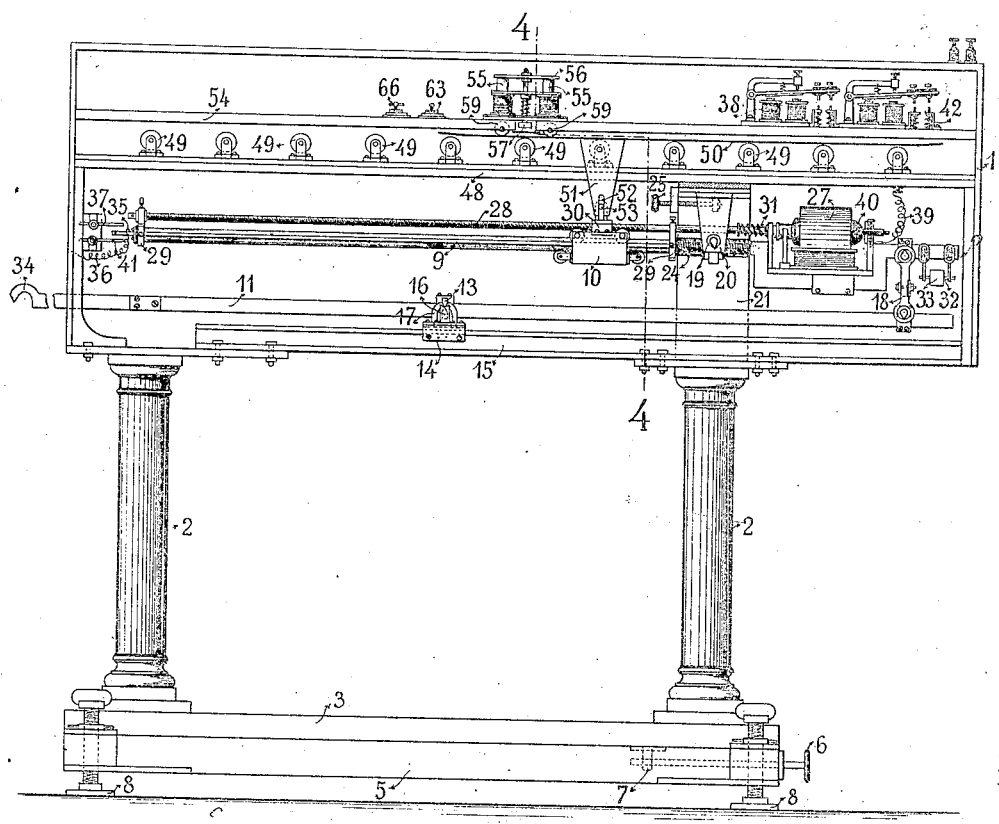
Figure 8:
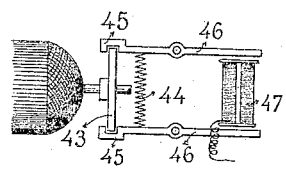
Figure 9:
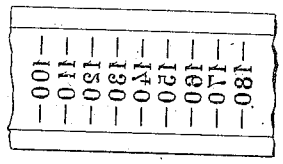

Figure 1 is an elevation of the improved automatic balance, the front wall being removed to more clearly show the interior parts. Fig. 2 is an end view from the left of Fig. 1. Fig. 3 is a section on an enlarged scale and on the line 4 4 of Fig. 1, while Figs. 4 to 14 show details of the device.

For the sake of greater clearness most of the electric wires are not shown in Fig. 1 and they are shown completely only in Fig. 7.

The device shown in the drawings is principally intended for weighing railway-wagons; but a similar arrangement can also be used with any other balance if the weight is transmitted to a horizontal beam.

The whole device is inclosed in a dismountable casing 1, resting on the standards 2, which are themselves supported by the plate 3. The whole arrangement, together with the plate 3, can be displaced in the undercut guides 4 4 of the wooden base-plate 5, Fig. 2, by means of the adjusting-screw 6. This screw is situated in a corresponding recess in the lower surface of the base-plate in such a manner that it can be easily rotated without altering its position; but when so rotated it laterally displaces the nut 7, which is rigidly connected to the lower surface of the plate 3, Fig. 1. The base-plate 5 is carried by feet 8, which are provided with screw-threads and thumb-pieces, so that the balance can be brought into an absolutely-horizontal position.

The device arranged in the casing consists in the present case of the following main parts, viz: (a) the lever 9, provided with the weight 10, which is automatically displaceable on said lever by electrical means; (b) the transmission-lever 11, which is movably connected at its right-hand end to the end of the main lever 9, but projects at its other end through an opening 12, Fig. 2, in the casing, where it is connected to the beam or lever of the balance; (c) the electromotor, arranged on the main lever, and the weight displaceable by said motor; (d) the recording apparatus; (e) the source of electrical energy, the wires, relays, and the like.

The double-armed transmission-lever 11 bears, by means of the knife-edges 13, on the support 14, which is longitudinally displaceable on the rail 15. Below the knife-edges 13 the lever is provided with other upwardly-directed knife-edges 16, on which the lower surfaces of the clamps 17 bear, said clamps being arranged on the surface of the support so that the edges 13 and 16 are all in one straight line. In this manner the lever 11 is connected to the support, but can move therein with slight friction. The inner end of lever 11 is connected to the lever 9 by two links 18— that is to say, by one link on each side. Each link 18 is provided at its ends with rings in which engage knife-edges on the levers 9 and 11, said edges bearing on the inner surfaces of the rings.

The main lever 9, connected to the transmission-lever, is balanced on the edges 19 on two holders or brackets 20, which are longitudinally displaceable with regard to the supports 21. The position of the edge 19 on the main lever is adjusted by means of two nuts 22, Fig. 4, which hold the sleeve 23 with the edges fast to the main lever on both sides. For this purpose the said main lever is provided for a certain distance with screw-threads 24. This arrangement is shown on an enlarged scale in Fig. 4. The position of the holders may be accurately adjusted in guides on the standards 21 by the screw 25, engaging a nut 26, connected to them. The main lever 9 consists of a solid rod, on which the weight 10, formed as a carriage, is displaceable. Near its right-hand end the rod is bent to form a recess for reception of the electromotor 27. The armature-shaft of said motor is connected to a screw-threaded rod 28, which is parallel with the rod 9 and rotatable in the bearings 29, which are fixed on the solid rod 9. When rotated, the screw-threaded rod 28 displaces the weight 10 in the longitudinal direction of the lever (by means of the nut 30, arranged on it) to the right or left, according to the direction in which said rod 28 is rotated. The rod 28 is connected to the motor-shaft by an elastic coupling 31, which, for instance, can be arranged as shown on an enlarged scale in Fig. 5—that is to say, in the form of a coiled spring adapted to connect the ends of armature-shaft and rod 28, which contact with each other. As shown in Fig. 2, on the right-hand end of the main lever a threaded rod 32 is arranged, on which a weight 33 is adapted to be displaced in any suitable manner, said weight serving to completely overbalance the lever.

The outwardly-projecting end 34 of the transmission-lever is connected, by means of a suitable connecting part provided with edges, (not shown,) to the beam of the loaded balance. Assuming that the load on the balance, which represents Q units of weight, which is transmitted to the point of the balance-beam to which said connecting part is attached and which connects said beam with the end 34, is in the proportion of $\frac{Q}{m}$ and if the support 14 is arranged as, for instance, shown in the drawings—that is to say, in the center of the distance between 34 and 18—the load $\frac{Q}{m}$ will also be transmitted to the right-hand end of the transmission-lever 11, and consequently also to the right-hand end of the main lever in the same proportion $\frac{Q}{m}$. It is, however, evident that according to the displacement of the support 14 this proportion can be varied as desired by increasing or reducing it.

The load on the end of the main lever is determined in the ordinary way, according to the distance to which the weight 10 is displaced from the point of support of the lever, so as to produce equilibrium. For determining said distance a corresponding scale is arranged on the solid rod 9 of the main lever. The weight is on the zero-point of said scale when the lever freed from load is in complete equilibrium. When the load on the balance bears on the right-hand end of the lever 9, the left-hand end of said lever will rise, and to produce equilibrium the weight 10 must be displaced to the left. If, however, the weight has already been moved too far in the latter direction, the left-hand end of the lever falls, and the position of the weight has again to be altered to obtain equilibrium by displacing said weight to the right.

From the above description it will be understood that when displacing the weight by electrical means the mechanism must be arranged in such a manner that in the upper position of the left-hand end of the lever the weight is displaced to the left and, conversely, in the lower position to the right and is not moved at all as soon as equilibrium is established. These movements can be obtained by electricity, as mentioned above, in different ways. In the example shown in the drawings one of the simplest and most practical methods has been chosen—viz., the use of an electromotor with direct current over the armature and means for reversing the current on the armature, the shaft of which in is direct connection with the above-mentioned screw-threaded rod 28. As is known, such a motor revolves in one direction or the other, according to the way in which the current enters or passes over the armature. If therefore the arrangement is made that in the upper position of the left-hand end of the lever 9 the motor-armature and with it the rod 28, are rotated in such a direction that the screw-nut 30, and with it the weight 10, are displaced to the left and that, on the contrary, in the lower position of the left-hand end of the lever the armature revolves in the opposite direction and displaces the weight 10 to the right and that in equilibrium the current ceases completely the necessary conditions are obtained. For these purposes the following arrangements are provided: At the extreme left-hand end of the lever 9, as shown in Fig. 1, the contact-plate 35 is arranged and insulated from said lever. This plate is connected, for instance, by a wire 36 to the positive pole of the source of electricity—for example, a battery. The freely-movable end of the wire from the plate to the wall of the casing has no influence on the movement of the lever. In the upper position of the lever the contact-plate 35 makes contact with the contact-lever 37, arranged on the wall of the casing and through which the current passes to the relay 38 and thence back to the battery. The relay 38 is double-acting and closes the circuit of the battery referred to. The direction of the current in this circuit passing twice through the relay 38 is shown in the diagram Fig. 7 by arrows having one tail. As shown in this diagram, the current after leaving the battery enters the magnet of the electromotor,) the wire for this purpose being shown in Fig. 1 by 39,) thence to the terminal 2 of the relay and into the armature 40 of the motor, over which it passes in a determined direction—for instance, according to the diagram, anticlockwise—then from the armature to the terminal I of the relay 38, and back to the battery. With such a direction of the current the armature rotates in such a direction that the rod 28, revolving with the armature, rapidly displaces the weight 10 toward the left-hand end of the lever until equilibrium is established. At this moment the contact-plate 35 is disengaged from the plate 37, so that the circuit is broken. In the event of a too rapid rotation of the motor it may happen that the weight is moved slightly too far to the left. In this case the contact-plate 35 engages the lower contact-plate 41, which is also arranged on the wall of the casing, whereupon the current passes to the other relay 42 and closes the circuit to the battery. Relay 42 is constructed exactly in the same way as relay 38. It is therefore also a double relay, and when closed the current flows, as indicated in Fig. 7, (in which the circuit is shown by arrows with double tails,) from the battery through the same wire 39 and in the same direction to the magnets of the motor, from said magnets through terminal 3 to the relay 42, and then into the armature 40 of the motor, over which it passes, however, through that brush from which the first-described current starts when relay 38 is closed. It therefore flows over the armature in an opposite direction to that first described—that is to say, according to the diagram, in a clockwise direction—and passes from the armature through the other brush to the contact 4 of the relay 42, and thence back to the battery. The armature revolving in the opposite direction causes the weight 10 to be returned toward the right, so that the contact-plate 35 is removed from contact-plate 41 and the circuit is broken. During this second movement of the motor by means of the relay 42 the motor can not attain excessive speed, even when making a very large number of revolutions of the armature itself—for instance, over one thousand revolutions per minute—since during the first movement by the relay 38 the weight was only moved a short distance too far, the current having been interrupted at the moment of equilibrium. The excessive speed of the motor can, however, be prevented in a simple manner by a brake arrangement—for instance, by means of an arrangement as diagrammatically shown in Fig. 8, in which the motor-shaft carries a disk 43, strongly keyed thereon, and onto which brake-blocks 45 are pressed by springs 44 at the moment the circuit is broken, said blocks being arranged on one end of the arms of the armatures 46 of the electromagnets 47. The other ends of said arms are attracted by the electromagnets, and, as may be seen from said Fig. 8, the shaft can freely rotate during the passage of the current through the magnets 47, but is braked at the moment the circuit is broken.

Figure 10:
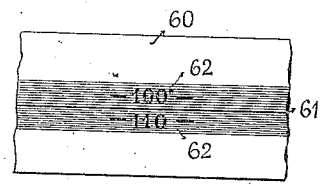
Figure 11:
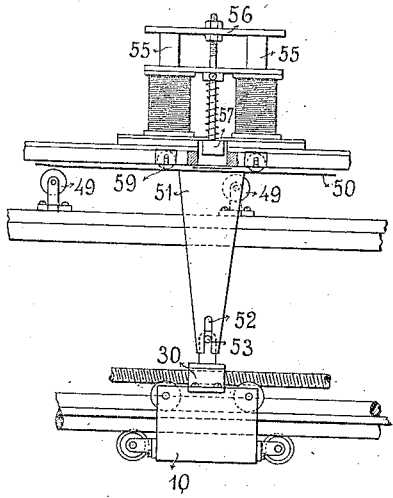
Figure 12:
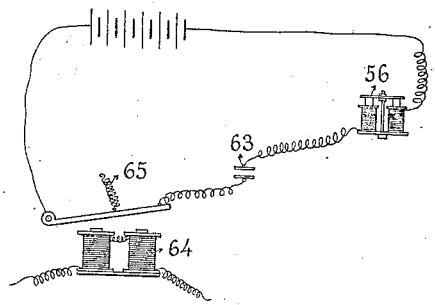
Figure 13:
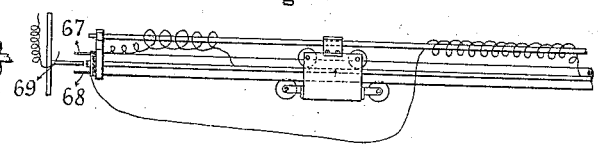
Figure 14:
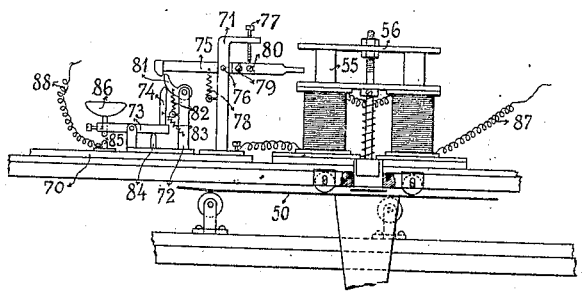

The principal purpose of this invention being to reduce the time occupied in weighing, it is necessary to provide the machine with an automatic printing or recording device. This must be arranged to automatically indicate at each weighing operation the position to which the weight has been brought for obtaining equilibrium. A suitable device for this purpose is shown in the annexed drawings, Figs. 1 and 3. In the upper part of the casing parallel to the main lever is a plate 48, and on the latter is arranged a series of rollers 49, on which rests a metal ribbon or band 50. Part of this ribbon is shown on an enlarged scale in Fig. 9. The upper surface thereof is provided with a similar scale as the main lever 8; but the figures on the ribbon are in relief and reversed to the figures to be obtained, so that they may be adapted for printing or impressing. On the edges of said ribbon are arranged at both sides comparatively wide and rigid metal plates 51, which are provided at their lower ends with slots 52, into which the transverse pin 53 freely engages. The said pin is fixed on the nut 30, as shown in Fig. 12, which shows the automatic recording device on an enlarged scale. When displacing the nut 30 in the longitudinal direction of the main lever, it carries the plates 51 with it and simultaneously the metal band 50, which is thus caused to slide over the pulleys 49. Above the supporting-plate 48 is a second support 54, parallel thereto and on which is arranged a double solenoid with iron cores 55, connected to each other by a cross-bar support 56. From the center of said rod 56 depends a vertical pin, the lower end of which passes through a corresponding opening in the support 54 in such manner that it projects over the surface of the metal band. At the lower end of said pin is a cylindrical block of india-rubber 57, which serves as printing-stamp. The cores are prevented from unintentionally entering the solenoids by the coil-spring 58. The figures on the printing-band are inked by the rollers 59, which revolve in suitable bearings in the support 54. Between the rubber stamp 57 and the metal ribbon paper sheets are placed or a paper band 60 is conducted in a transverse direction, as shown in Fig. 3. These paper sheets or band have on the lower surface thereof a cross-line 61, as shown in Fig. 10, said line indicating the lower surface of one section or division of the band. As with the device described there is no space for the arrangements of the units of the scale on the metal band and the scale on said band is only in tens, for indicating the units I have arranged on both sides of the cross-line 61 ten thin parallel lines 62 of a width corresponding to the divisions on the metal band. When the balance is at rest, the zero-point of the scale is on the metal band below the stamp 57—that is to say, exactly opposite the cross-line 61 on the paper band, which lies across the metal band, as shown in Fig. 3.

For weighing any load the nut 30 and simultaneously therewith the metal band 50 are displaced to the left, and at the moment of equilibrium the cross-line 61 on the paper band is just opposite that point of the scale on the metal band which corresponds to the point on which the weight 10 remained on the scale of the main lever. If at this moment—that is to say, the moment of equilibrium—current is caused to flow through the solenoids, the latter immediately attract their cores, so that the stamp 57 presses the paper band firmly against the surface of the metal band. If by this means the impression shown in Fig. 10 is made, the said impression will indicate that the load weighs one hundred and three units, supposing each scale-division to represent ten kilograms. The exact weght within one-half kilogram can always be read off the scale, since it will be seen whether the division-line exactly coincides with one of the lines 62 or lies between two lines 62.

Current must flow through the solenoids at the moment at which equilibrium exists, the main current being at this moment interrupted, as already mentioned. If suitable electromagnets are provided, it is easy to arrange that the current switched off the main circuit will pass through the solenoids and will not be finally cut off until the printing apparatus has been operated. In practice this arrangement would, however, in some cases be inconvenient—namely, in cases in which automatic mechanism is not used for moving the paper band. In such cases the scale attendant may through carelessness or the like omit to move the paper band, so that a new impression will be made at the same place as the previous impression, or if it has been omitted to place a fresh sheet or slip of paper in front of the stamp the latter will become soiled with ink. It is therefore, in view of the fact that the apparatus illustrated is not provided with means for automatically moving the paper band preferable to close the circuit of the solenoids by means of a special switch or contact-stud 63, Fig. 1, which cannot be operated until the current in the main circuit has been interrupted. This arrangement is diagrammatically illustrated in Fig. 12, in which the main current flows through the electromagnet 64, the armature of which is connected to springs 65 in such a manner that when the said armature is released by the magnet it closes a gap in the circuit controlled by the switch 63. It may occur that through weakening of the brake-spring 44, Fig. 2, or other causes the motor-armature will acquire considerable velocity, so that the lever will require a considerable amount of time in order to assume the position of equilibrium. This would not only increase the length of time required for weighing, but will also injure the band, which would at the moment of equilibrium be subjected to the action of two opposite forces—namely, to the action of the stamp, tending to hold the band in position, and to the action of the weight 10, Fig. 1, which would owing to the rapid rotation of the armature tend to move the band along. In order to prevent this, the stamp is only momentarily pressed against the band. For this purpose the arrangement shown in Fig. 14 can be used instead of an ordinary stud. According to this arrangement a small plate 70 is provided with standards 71 and 72 and with a key 73, to which a finger 74 is fixed. To the upper end of the standard 71 a lever 75 is pivoted at 76, the said lever 75 being normally held in position by means of an abutment-screw 77 and a spring 78. Screws 79 and 80 allow of adjusting the right-hand arm of the lever 75 in an upwardly or a downwardly-inclined position, as required. To the upper end of the standard 72 is pivoted a lever 81, which is caused by a spring 82 to bear against a projection of the left hand arm of the lever 75. When the key 73 is in its normal position, in which it is held by means of a spring 83 and an abutment 84, the lever 81 abuts against the finger 74. The action of this device is as follows: When the load has been placed on the platform and till the moment at which equilibrium is attained, the key 73 is depressed, so that it makes contact at 85. As soon as the point of equilibrium is passed by the lever 9 current flows into the circuit, including the printing-solenoids, and passes in the direction of the arrow through the standard 71, the levers 75 and 81, the standard 72, the key 73, the stud 85, and the wire 88 to the negative terminal of the generator. The solenoid-cores are momentarily attracted and an impression on the paper strip is thus produced. At the same time the yoke 56, connecting the solenoid-cores, abuts against the right-hand end of the lever 75, so that the left-hand arm of the latter is lifted and releases the lever 81. The said lever 81 is thereupon pulled downward by the spring 82 and the solenoid-circuit is thus broken. The solenoid-cores therefore ascend and the lever 75 returns to its normal position. When the key 73 is released and moved back into its normal position by the spring 83, the finger 74 pushes the lever 81 upward and causes the latter to again engage behind the projection at the end of the lever 75. It is also desirable that means should be provided for switching off the main current during the intervals between working in order that accidental movements of the levers do not cause waste of electrical energy. For this purpose the switch 66 is provided.

It will be seen that the methods available for converting the electrical energy into mechanical energy for displacing the weight are practically unlimited and that the application of the various methods merely necessitates constructional modifications which it is easy for any expert to make. The selection of the electric motor for displacing the weight and of the means for transmitting motion form the motor to the weight and the arrangement of the conductors in the apparatus are therefore merely constructional details and do not form part of the principle of the invention. This principle consists in the arrangement of two electric contacts in such a manner that they only come into contact when the sliding weight-lever is deflected from the position of equilibrium in any direction upward or downward, the current passing over each contact to a special circuit which is so connected with the motor for displacing the weight on the lever that when either circuit is energized the weight is moved in the direction opposite to that in which it is moved by the energizing of the other circuit, the direction of movement being always toward the elevated end of the lever—that is to say, that if the end of the lever on which the weight is situated is deflected upward the displacement is toward that end, whereas if the said end is deflected downward the displacement is away from that end. It is therefore obvious, first, that the apparatus described and illustrated can itself be used as a balance if the load to be weighed is suspended from the projecting end 34 of the lever 11 or placed in a scale-pan provided for that purpose, and, secondly, that the displacement of the weight in the manner of the present invention can be directly used in connection with the lever of any scale-beam without absolutely necessitating the use of the particular apparatus hereinbefore described.

Having now particularly described and ascertained the nature of my said invention and in what manner the same is to be performed, I declare that what I claim is—

1. In an automatic electric balance, the combination of a weigh-lever, contacts for coöperation with a single contact, a sliding weight and electric means mounted on said weigh-lever for automatically displacing said weight, individual relays, a single contact at the end of said lever adapted to energize said relays, and electrical connections, said relays being disposed for coöperation with said electric means.

2. In an automatic electric balance, a swinging lever, a weigh-lever, individual relays, a sliding weight, an electric motor arranged on the weigh-lever, and adapted to adjust said weight and controlled by the making contact by means of the freely-swinging lever end, a single contact at the end of the lever adapted to energize different relays, according to whether the lever moves upward or downward out of the position of equilibrium, and the said relays being adapted to close the motor-circuit in such a manner as to produce rotation in different directions and contacts for coöperation with said single contact.

3. In an automatic electric balance, the combination of a lever 9, a sliding weight 10, a double-armed transmission-lever 11, a link connection between said levers, and an electric motor mounted on said lever 9 and relays disposed for coöperation with said motor and connections between said motor and weight for automatically displacing said weight on said lever 9.

4. In an automatic electric balance, the combination of a weigh-lever, a motor mounted thereon, relays, a single oscillating contact carried by said weigh-lever, and an automatic recording mechanism having a member operatively connected to the sliding weight.

5. In an automatic electric balance the combination of a weigh-lever, a motor mounted thereon, relays, a single oscillating contact carried by said weigh-lever, and an automatic recording mechanism having a member operatively connected to the sliding weight, said recording mechanism embodying a removable band and electrically-operated means mounted for coöperation with said band.

In testimony whereof I affix my signatur in presence of two witnesses.

WINCENTY DWORZYNSKI.

Witnesses:
 GYGMUNT PAUKOWSKI,
 STANISLAW POSKSCZYSKI.